(12) United States Patent
Deiss

(10) Patent No.: US 10,160,190 B2
(45) Date of Patent: Dec. 25, 2018

(54) METHOD FOR THE PRODUCTION OF A SEALING TAPE ROLL

(71) Applicant: ISO-Chemie GmbH, Aalen (DE)

(72) Inventor: Martin Deiss, Abtsgmuend (DE)

(73) Assignee: ISO-Chemie GmbH (DE)

( * ) Notice: Subject to any disclaimer, the term of this patent is extended or adjusted under 35 U.S.C. 154(b) by 433 days.

(21) Appl. No.: 14/826,247

(22) Filed: Aug. 14, 2015

(65) Prior Publication Data
US 2016/0059536 A1   Mar. 3, 2016

(30) Foreign Application Priority Data

Aug. 26, 2014 (EP) ..................................... 14182229

(51) Int. Cl.
*B65H 35/02* (2006.01)
*B65H 18/00* (2006.01)
(Continued)

(52) U.S. Cl.
CPC .......... *B32B 37/20* (2013.01); *B29D 99/0053* (2013.01); *B32B 37/1284* (2013.01); *B32B 38/0004* (2013.01); *B32B 38/0012* (2013.01); *E04B 1/6812* (2013.01); *B32B 37/02* (2013.01); *B32B 37/06* (2013.01); *B32B 37/12* (2013.01); *B32B 2305/022* (2013.01); *B32B 2305/72* (2013.01); *B32B 2405/00* (2013.01); *B65H 18/00* (2013.01); *B65H 35/02* (2013.01); *E06B 1/62* (2013.01); *E06B 2001/626* (2013.01); *F16J 15/02* (2013.01); *Y10T 156/1067* (2015.01); *Y10T 156/1069* (2015.01)

(58) Field of Classification Search
None
See application file for complete search history.

(56) References Cited

U.S. PATENT DOCUMENTS

| 3,177,109 A * | 4/1965 | Ziegler .................. B26D 3/006 |
|---|---|---|
| | | 156/259 |
| 4,401,716 A * | 8/1983 | Tschudin-Mahrer ........................ |
| | | E01C 11/106 |
| | | 428/317.3 |

(Continued)

FOREIGN PATENT DOCUMENTS

| DE | 19641415 A1 * | 4/1998 | ............... E04B 1/66 |
|---|---|---|---|
| EP | 2620565 A1 | 7/2013 | |
| EP | 2733271 A1 * | 5/2014 | ............... E06B 1/62 |

*Primary Examiner* — Linda L Gray
(74) *Attorney, Agent, or Firm* — Jansson Munger McKinley & Kirby Ltd.

(57) ABSTRACT

A method for the production of sealing tape rolls of flexible, compressed foam with at least one barrier layer extending in a radial direction thereof, the barrier layer arranged axially between two layers of the foam, comprises the following steps: providing a foam web of flexible foam; introducing at least one cut into the foam web in a longitudinal direction thereof to form parallel foam strips; introducing film strips, adhesive tape strips, and/or an adhesive liquid medium into the intermediate spaces between each pair of adjacent foam strips produced by the cuts; bonding all of the foam strips together to produce a foam-barrier layer web; winding up the foam-barrier layer web into an intermediate roll; and cutting the intermediate roll at one or more points in an axial direction thereof to produce a plurality of sealing tape rolls, which are less wide than the intermediate roll.

14 Claims, 7 Drawing Sheets

(51) Int. Cl.
*E04B 1/68* (2006.01)
*E06B 1/62* (2006.01)
*B32B 37/06* (2006.01)
*B32B 37/12* (2006.01)
*F16J 15/02* (2006.01)
*B32B 37/20* (2006.01)
*B32B 38/00* (2006.01)
*B29D 99/00* (2010.01)
*B32B 37/02* (2006.01)

(56) References Cited

U.S. PATENT DOCUMENTS

| | | | | |
|---|---|---|---|---|
| 4,486,990 | A * | 12/1984 | Bauch | E06L 39/02 |
| | | | | 49/490.1 |
| 2009/0246498 | A1 * | 10/2009 | Deiss | E04B 1/68 |
| | | | | 428/220 |
| 2010/0003465 | A1 * | 1/2010 | Deiss | E04B 1/6812 |
| | | | | 428/174 |
| 2010/0009118 | A1 * | 1/2010 | Deiss | E04B 1/6812 |
| | | | | 428/121 |
| 2013/0154201 | A1 * | 6/2013 | Kethorn | E06B 1/64 |
| | | | | 277/630 |

* cited by examiner

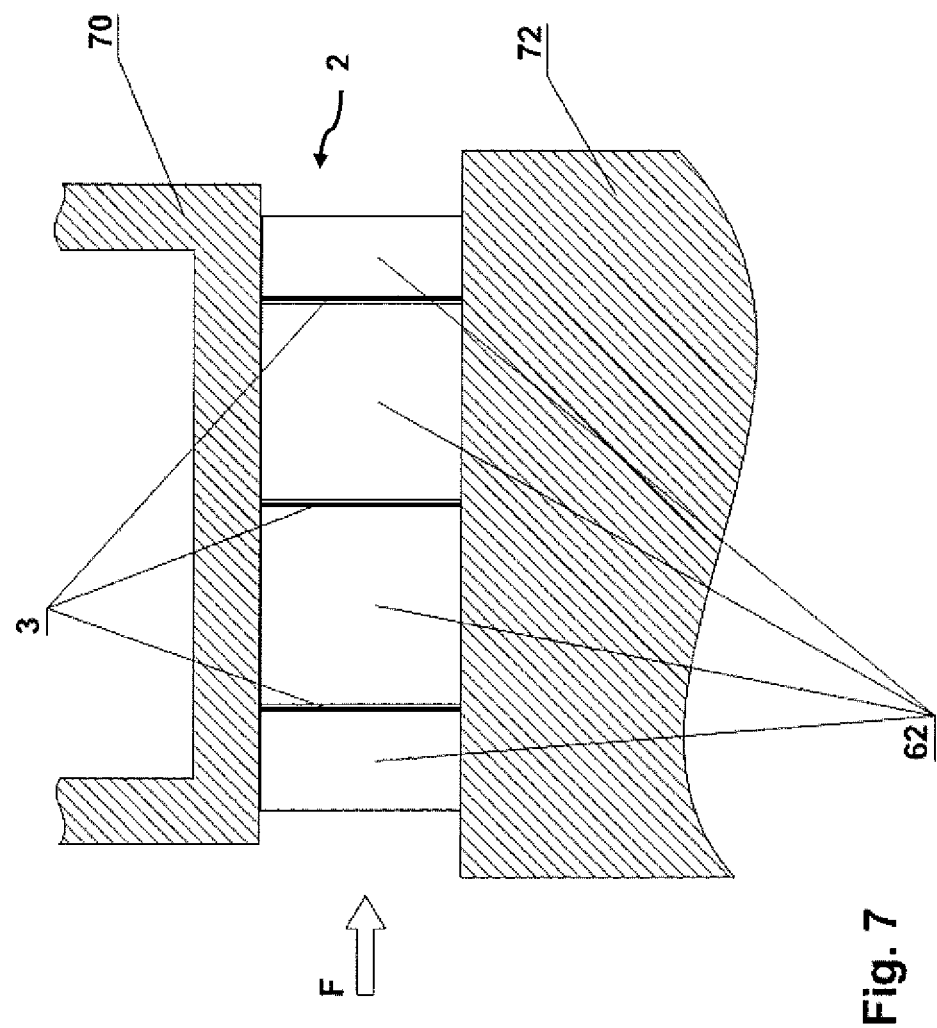

METHOD FOR THE PRODUCTION OF A SEALING TAPE ROLL

CROSS REFERENCE TO RELATED APPLICATION

This application claims priority based on European patent application EP 14 182 229.6 filed Aug. 26, 2014. The entire disclosure and contents of this application are incorporated by reference into the present application.

FIELD

The present invention relates to a method for the production of a sealing tape roll.

BACKGROUND

Sealing tapes unwound from sealing tape rolls are usually used to seal the joints between, for example, a frame profile of a window or a door and the wall of a building to seal off the joints against drafts and driving rain. A film strip provided additionally on one side surface of the sealing tape furthermore increases the impermeability of the strip to water vapor; see, for example, U.S. Pat. No. 4,401,716, US 2010/0009118 A1 or US 2010/0003465 A1. Nevertheless, films which are attached externally to the sealing tape suffer from the disadvantage that they can be damaged during the transport or installation of the sealing tape.

A sealing tape roll is known from DE 196 41 415 A1, which comprises at least one barrier layer extending in the radial direction, which is arranged between two layers of the foam and thus in the interior of the sealing tape roll. As a result, the barrier layer is better protected from damage. The barrier layer consists of an adhesive or of a lamination material. To produce a sealing tape of this type, large two-dimensional barrier layers are formed on sheets of an open-pore foam material by lamination or the use of an adhesive. Several layers of foam sheets and barrier layers are stacked to form laminate blocks. These laminate blocks are cut at right angles to the large two-dimensional barrier layers to obtain plates. The plates are then wound up into wide rolls in such a way that the barrier layers and the foam material are arranged in a row in the axial direction on the circumference of the rolls. A wide roll of this type is then cut into disks between the individual barrier layers to obtain several sealing tape rolls. This method requires complicated work steps, and the length of the sealing tapes produced is limited by the limitation imposed by the laminate blocks, which must be small enough to be processed by machine.

SUMMARY

It is an object of the present invention to provide a method for the production of a sealing tape roll with an internal barrier layer extending in a radial direction thereof, which method is simple and reliable and by means of which it is also possible to produce very long sealing tape rolls.

According to an aspect of the invention, the method for the production of a sealing tape roll consisting of flexible, compressed foam with at least one barrier layer extending in the radial direction thereof, the barrier layer arranged axially between two layers of foam, comprises the following steps in the order given: first, providing a foam web of flexible foam; second, introducing at least one cut into the foam web in a longitudinal direction of the foam web to form parallel foam strips; next, introducing a film strip, an adhesive tape strip, and/or an adhesive liquid medium into each intermediate space between two adjacent foam strips formed by the at least one cut; bonding all of the foam strips together to produce a foam-barrier layer web, in which foam strips and at least one barrier layer alternate; finally, winding up the foam-barrier layer web into a sealing tape roll, or winding up the foam-barrier layer web into an intermediate roll and cutting the intermediate roll at one or more points in the axial direction to produce a plurality of sealing strip rolls which are less wide than the intermediate roll; or introducing at least one cut into the foam-barrier layer web in a longitudinal direction of the foam-barrier layer web to form foam-barrier layer strips and winding up the foam-barrier layer strips into individual sealing tape rolls.

In this way, it is possible to produce sealing tape rolls of flexible, compressed foam with at least one barrier layer extending in the radial direction and arranged axially between two layers of the foam in an especially economical manner and also in very long lengths. In addition, the barrier layer is protected by its position between two foam strips from external damage during transport and installation of the sealing tape. The properties of the sealing tape, furthermore, can be varied in an especially large number of different ways, because foam strips of any desired type can be combined with each other.

The step of providing the foam web preferably comprises the steps of providing a starting roll consisting of the wound-up foam web and the step of unwinding the foam web from the starting roll. In this way, it is possible to provide the foam web in an especially space-saving manner and in almost any desired lengths. A greater variation of the resulting length of the sealing tape is therefore possible.

In a preferred embodiment, the foam web is not impregnated and the method for the production of the sealing tape comprises the following additional steps of saturating the foam-barrier layer web with an impregnating agent and drying the impregnated foam-barrier layer web.

In this case the barrier layer adheres especially well to the two adjacent, as yet unimpregnated foam strips, which simplifies the step of bonding the adhesive material to the foam strips.

Before the step of saturating the foam-barrier layer web, the following steps are preferably carried out. Winding up the foam-barrier layer web into a supply roll and unwinding the foam-barrier layer web from the supply roll.

In this way, the length of the processing line required for the method can be reduced, and it is possible, for example, to transfer the supply roll to a parallel conveying line prior to further processing.

In the case of alternative (ii), it is especially preferred for the intermediate roll to be cut in the axial direction by saws at one or more points to produce the plurality of sealing tape rolls, which are less wide than the intermediate roll. Thus sealing tape rolls of any desired width and with any desired number of internal barrier layers can be easily produced. The throughput of the device is also increased as a result.

The introduction of each film strip or adhesive tape strip into each intermediate space between two adjacent foam strips is preferably done by unwinding the film strip or adhesive tape strip from a coil and deflecting the film strip or adhesive tape strip by means of a deflecting element. As a result, each film strip or adhesive tape strip can be provided in any desired length above, below, or next to the foam web and nevertheless be effectively introduced into the intermediate space in the conveying direction of the foam web.

The introduction of the liquid adhesive medium into each intermediate space is preferably accomplished by means of a nozzle.

The bonding of the foam strips preferably comprises the step of bonding each film strip to the two foam strips adjacent to the film strip by lamination.

The bonding of all of the foam strips together can also comprise the step of curing the adhesive liquid medium in each intermediate space.

The curing of the adhesive liquid medium is achieved by chemical or physical processes.

In many preferred applications, the bonding of all the foam strips together comprises the step of applying heat.

In many preferred applications, the bonding of all the foam strips together comprises the step of pressing the foam strips against each other.

It is also preferred that a knife or a saw be used to introduce each cut into the foam web or into the foam-barrier layer web. Knives and saws are especially well adapted to the introduction of cuts into such webs.

In a preferred embodiment, each cut passes through the foam web completely from top to bottom. In this way, each applied barrier layer can cover the entire side surface of the associated foam strip.

In the case that the foam-barrier layer web is cut according to alternative (iii), it is necessary for each cut to pass through the foam-barrier layer web completely from top to bottom.

BRIEF DESCRIPTION OF THE DRAWINGS

Additional features and advantages of the present invention can be derived from the following description, which refers to the drawings:

FIG. 7 shows a schematic cross-sectional diagram of a sealing tape produced by an embodiment of the method according to the invention.

DETAILED DESCRIPTION

Figure 1:
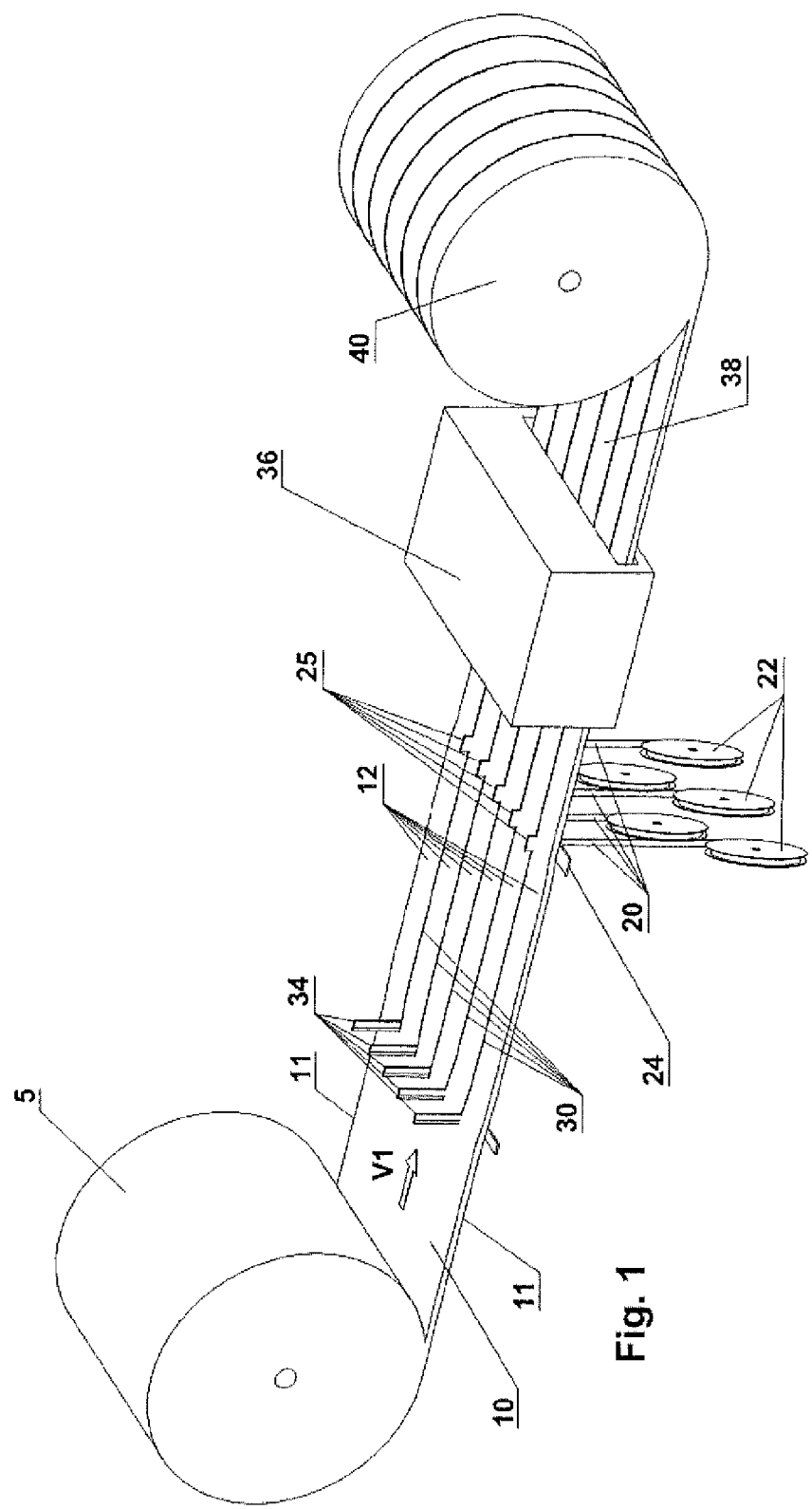
FIG. 1 shows a schematic perspective diagram of the sequence of steps according to an exemplary embodiment of the method according to the invention in a first section of a device adapted to the method.

FIG. 1 shows the first steps of an exemplary embodiment of the method according to the invention. On starting roll 5, a flexible foam is provided in long lengths of up to 200 meters, preferably of 5-100 meters and more preferably of 10-60 meters. Any of the known open-cell, mixed-cell, or closed-cell flexible foams such as those made of polyurethane, polyethylene, polyvinyl chloride or polypropylene which recover their original shape after compression can be used as the foam.

Because of the way in which starting roll 5 is provided, the foam web 10 can be transported and processed especially easily. As a rule, the foam web 10 on first roll 5 is in an uncompressed or only slightly compressed state. It is also possible for foam web 10 on starting roll 5 to be in a compressed state, but then, after it has been unwound from the starting roll 5, it must be ensured that the foam material will recover its original shape during the course of the process. It is also conceivable that individual foam webs 10 could be provided which have not been wound up into a starting roll 5, but a larger amount of space would be required to provide them. The width of foam web 10 is usually in the range between 1 cm and 5 meters and preferably in the range of 1.0-1.5 meters. The thickness of foam web 10 in the expanded state is usually in the range of 5 mm. and 30 cm. and preferably in the range of 1-12 cm.

After it has been unwound from starting roll 5, foam web 10 is moved in a conveying direction, which is identified by the arrow V1. By means of at least one knife 34, and preferably several parallel knives 34, at least one, preferably a continuous cut 30, or preferably several parallel continuous cuts 30, are introduced into foam web 10 in a longitudinal direction of foam web 10, preferably parallel to the longitudinal edges 11 of foam web 10. The longitudinal edges 11 are the edges of foam web 10 which are parallel to the conveying direction V1 and at a right angle to the axial direction of starting roll 5. To introduce the at least one continuous cut 30 into the foam web 10, it is possible to use, instead of the knives 34, any of the other methods known to the person skilled in the art for cutting foam webs 10 such as cutting by means of saws, heated wires, laser cutting devices, or water jet cutting devices. Cuts 30 can also be made over only a portion of the thickness of foam web 10, so that foam strips 12 remain connected to each other by a web of foam.

Each continuous cut 30 produces an intermediate space between two adjacent foam strips 12. Foam strips 12 produced by the at least one cut 30 can be of different widths, but preferably they are all of the same width. The width of foam strip 12 is preferably in the range 5-150 mm, and more preferably in the range of 10-80 mm.

In a subsequent step, a film strip 20 or an adhesive tape strip is introduced into each intermediate space. Each film strip 20 or adhesive tape strip is preferably provided on a coil 22 or roll and is preferably introduced into the intermediate space by way of at least one deflecting element 24. Each coil 22 can therefore be arranged in any desired position relative to the foam web 10, wherein each film strip 20 or adhesive tape strip is always deflected by an appropriate deflecting element 24 and introduced into the intended intermediate space essentially in the conveying direction V1. Deflecting shoulders or deflecting pulleys, for example, can be used as deflecting elements 24. It is also conceivable that a film web or adhesive tape web (preferably in the form of a roll) could be provided and that this web could be cut lengthwise into individual film strips 20 or adhesive tape strips, before they are introduced into the intermediate spaces between foam strips 12.

Adhesive tape strips are usually provided with at least one peel-off film, which is removed from the adhesive tape strip before it is inserted into the intermediate space.

Because the individual foam strips 12 lie closely against each other, it is advantageous, as a way of facilitating the insertion of the film strip or the adhesive tape strip, for each intermediate space to be spread open beforehand by means of a spreading element 25. As spreading elements 25, it is possible to use, for example, projections in the form of the bow of a ship, which expand in the conveying direction V1. In the exemplary embodiment shown here, the deflecting elements 24 are configured as integral parts of the spreading elements 25, but they can also be in the form of separate components.

It is also conceivable that each coil 22 could be arranged in such a way that the film strip 20 or adhesive tape strip can be introduced into the intended intermediate space without deflection. It is also possible for the film strip 20 or the adhesive tape strip to be provided and introduced in any other suitable form, such as in the form of strips of predetermined length.

After each film strip 20 or adhesive tape strip has been introduced into the intermediate space between two adjacent foam strips 12, all of film strips 20 or adhesive tape strips (preferably consisting of pressure-sensitive adhesive) are bonded to the two adjacent foam strips 12, preferably in the area of a bonding unit 36. The bonding step usually comprises, in general, a step of applying heat and/or a step of pressing the foam strips 12 against each other. In the case of film strips 20, the bonding to the foam strips 12 in the bonding unit 36 is preferably accomplished by lamination. The film strip 20 itself can also comprise one or several adhesive tape strips or a solid layer of a hot-melt adhesive.

Figure 2:
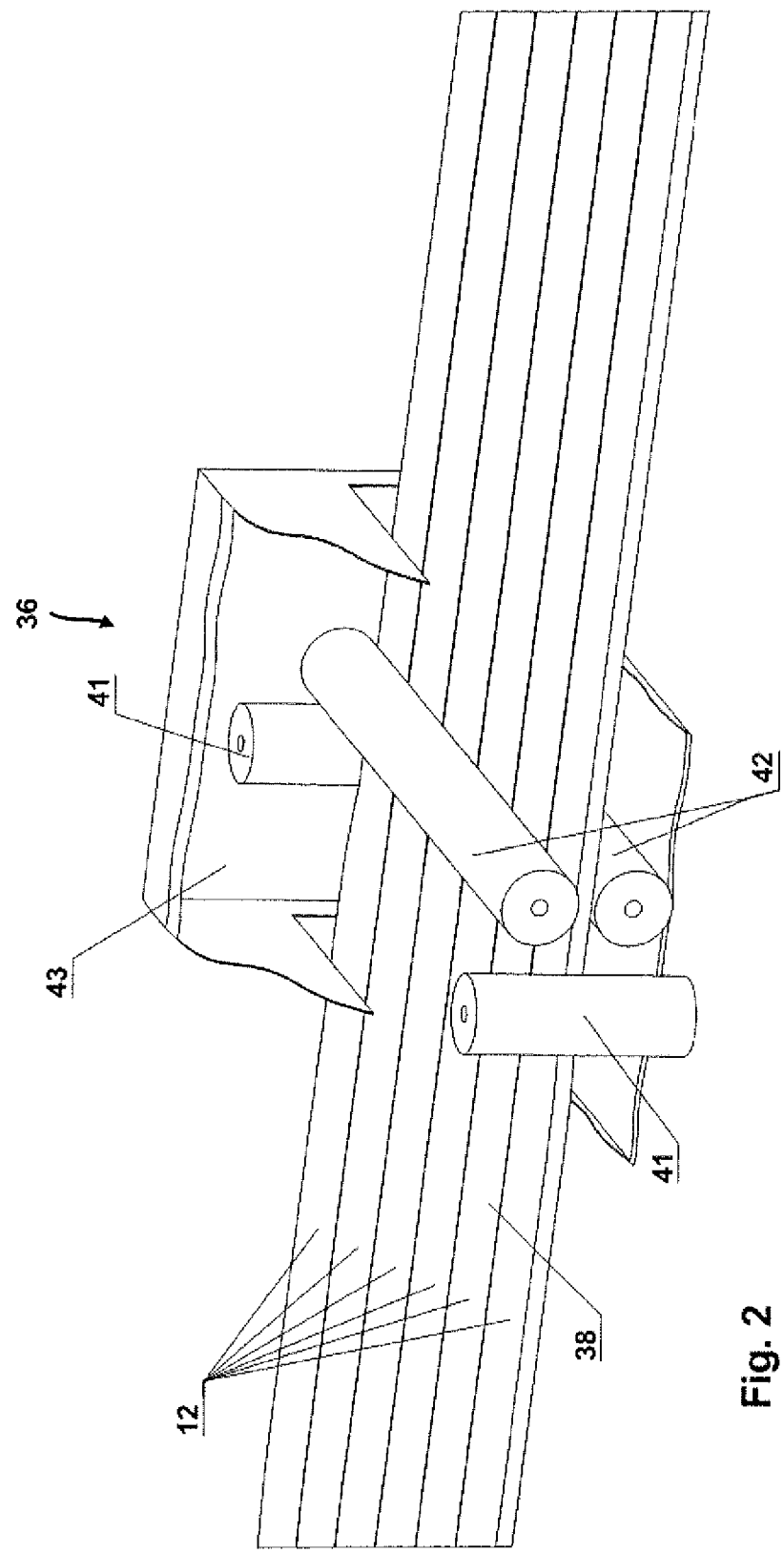
FIG. 2 shows a schematic diagram of a detail of the bonding unit in FIG. 1.

FIG. 2 shows a view of a detail of a possible bonding unit 36. Bonding unit 36 preferably comprises a pair of pressing rollers 41, which are arranged on the two narrow sides of the foam-barrier layer web 38 and which press individual foam strips 12 against each other. Each of pressing rollers 41 is preferably rotatably supported around a vertical axis, wherein two pressing rollers 41 rotate in opposite directions. A pair of traction rollers 42 is also preferably arranged in bonding unit 36; these rollers extend across the width of the foam-barrier layer web 38 and form a gap through which the foam-barrier layer web 38 passes. The two traction rollers 42 are driven in opposite directions around a horizontal axis, and they thus pull the foam-barrier layer web 38 through bonding unit 36. Such pairs of traction rollers 42 can also be used at other points of the production process. In bonding unit 36, traction rollers 42 could also be arranged upstream of pressing rollers 41.

Bonding unit 36 preferably also comprises a heating device 43, which is merely suggested in FIG. 2. Heating device 43 can preferably comprise a housing, which surrounds the foam-barrier layer web 38. Heating device 43 can be configured to produce heat in any desired way. Heating device 43 can be used in combination with pressing rollers 41. It is also possible to provide only heating device 43 or only pressing rollers 41 in the bonding unit 36. Heating device 43 can also be configured to bond only the upper and lower edge areas of the foam-barrier layer web 38 permanently together, in that the temperature and/or the heating time is adjusted accordingly.

In this way, a foam-barrier layer web 38 is formed, wherein the film strips 20 or adhesive tape strips now take over the function of barrier layers. The function of each barrier layer is preferably to reduce or to prevent the passage of air and/or water vapor. This also applies to all of the following exemplary embodiments.

Downstream from the bonding unit 36, the foam-barrier layer web 38 in the exemplary embodiment shown here can be wound up into a supply roll 40. It is also possible, however, for the foam-barrier layer web 38 to be sent continuously to the further processing steps or for the foam-barrier layer web 38 to be rolled up into a supply roll 40 between any other desired steps and to be unrolled from it prior to the following step. As a result, the number of steps occurring successively in the production line can be varied, and thus the length of the individual subsections of the production line can be adapted as appropriate to the amount of space available. The foam-barrier layer web 38 is usually present on the supply roll 40 in an uncompressed or in an only slightly compressed state.

Figure 3:
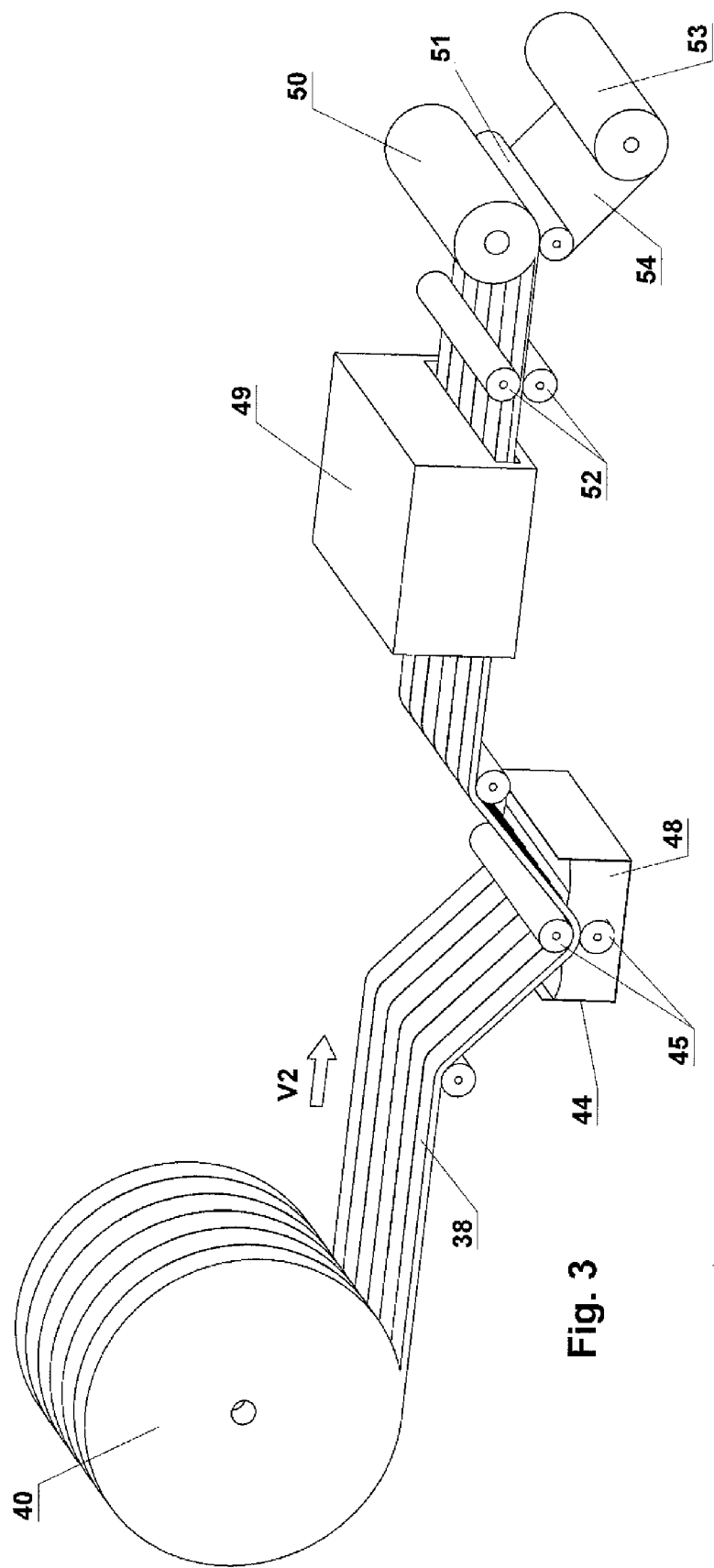
FIG. 3 shows a schematic perspective diagram of the sequence of steps according to the exemplary embodiment of the method according to the invention of FIG. 1 in a second section of a device adapted to the method.

If the provided foam web 10 has already been impregnated previously or if the sealing strip is to remain unimpregnated, the intermediate roll 50 of FIG. 3 or even the end product itself, i.e., the sealing tape roll 1, can be obtained right at this point (in either case preferably with the use of the compression roller 51 shown on the right in FIG. 3) instead of the supply roll 40 of FIG. 1.

If this is not the case, then the additional steps of the exemplary embodiment of the method according to the invention are carried out as shown in FIG. 3. For this purpose, the foam-barrier layer web 38, previously wound up into a supply roll 40, is first unwound again. In the exemplary embodiment of the method according to the invention shown in FIG. 3, the foam-barrier layer web 38 is guided in the next step through an impregnation unit 44 in a second conveying direction V2, which, depending on the arrangement of the subsections of the production line, can be the same as or different from V1. Two rollers 45 guide the foam-barrier layer web 38 into a bath of a suitable impregnation agent 48, and the foam becomes completely saturated with the impregnation agent. Conventional impregnation agents and methods for impregnating foams are known to the person skilled in the art. The foam-barrier layer web 38 is preferably compressed between the rollers 45 so that the subsequent recovery of the foam supports the uptake of the impregnation agent 48. After the impregnation in the impregnation unit 44, the impregnated foam-barrier layer web 38 is dried in a drying unit 49. In this unit, the impregnated foam-barrier layer web 38 is dried by known means, e.g., by a hot-air blower or radiant heater. Then the foam-barrier layer web 38 is wound up into an intermediate roll 50, preferably by the use of compression rollers 51, 52. It can be sufficient to use only one compression roller 51 directly at the transition to the intermediate roll 50, or a pair of compression rollers 52 can be used beforehand to compress the foam-barrier layer web 38. In the example shown, both options are used in combination. The foam-barrier layer web 38 on the intermediate roll 50 is in a highly compressed state.

If no heating device 43 was used previously, the drying unit 49 following the impregnation unit 44 can, in a special embodiment, also function as a heating device for the permanent bonding of all the film strips 20 or adhesive tape strips to the two adjacent foam strips 12. In this way, it would be possible to eliminate a heating step.

In addition, a double-side adhesive tape 54, lined on one side with a peel-off film, is preferably also applied to the foam-barrier layer web 38. Adhesive tape 54 is again stored in the form of a coil 53 or roll and is pulled from it. The application of the adhesive tape 54 to the foam-barrier layer web 38 is preferably done simultaneously with the winding-up of the foam-barrier layer web 38 into the intermediate roll 50, wherein the compression roller 51 produces the pressure required to bond the adhesive tape 54 to the foam-barrier layer web 38.

The impregnation of the foam can also be carried out at other points of the production method, such as before the introduction of the at least one continuous cut 30 into the foam web 10 or immediately after the introduction of the at least one continuous cut 30 into the foam web 10. The impregnation of the foam, furthermore, can be completely omitted, or it can already have been done before the foam web 10 is provided. The impregnation of the foam preferably takes place, however, after the introduction of each film strip 20 or adhesive tape strip into the intermediate space between two adjacent foam strips 12, because each film strip 20 or adhesive tape strip adheres better to a foam which has not been impregnated and can therefore be bonded more effectively to it.

Figure 4:
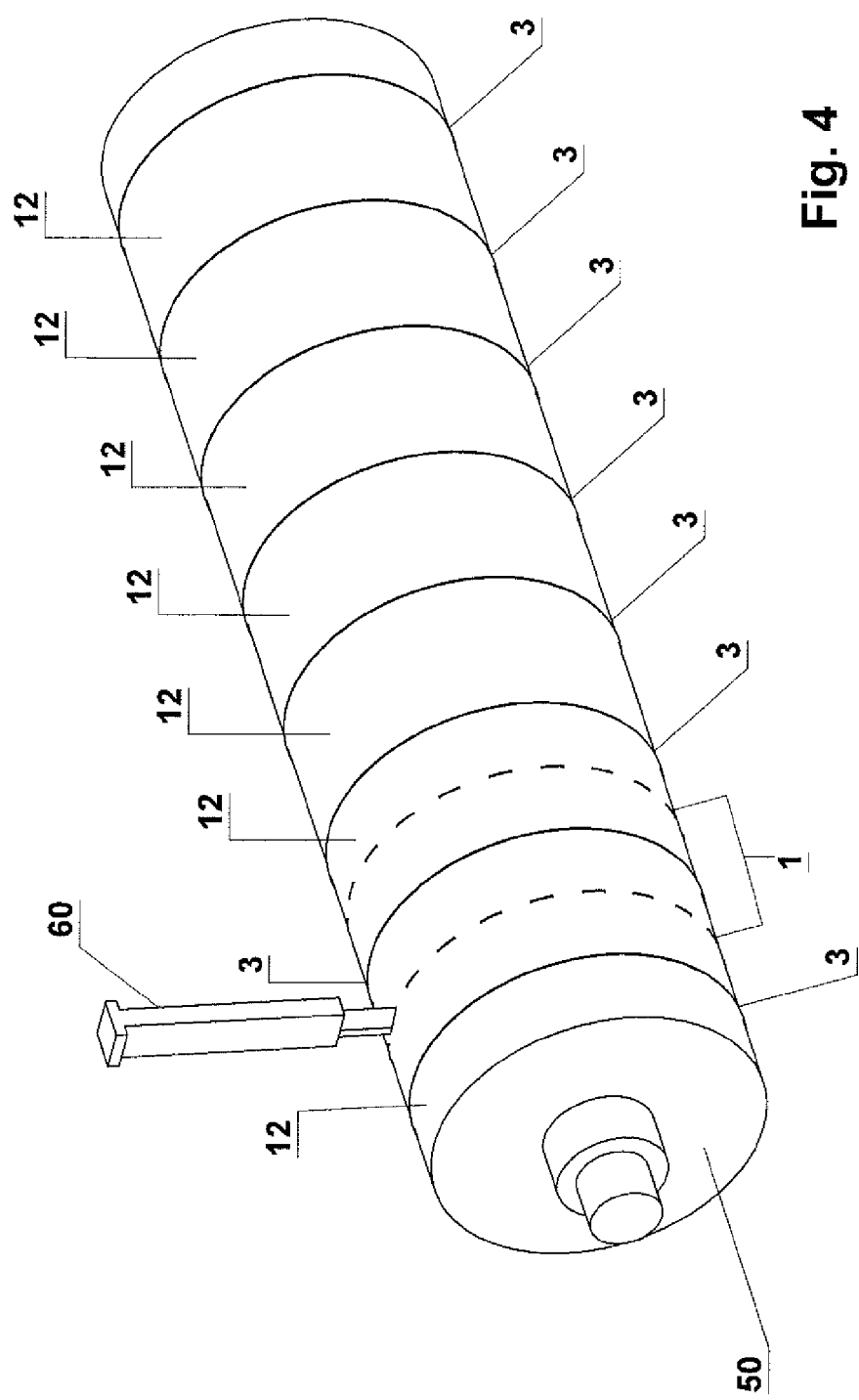
FIG. 4 shows a schematic perspective diagram of the step of cutting the intermediate roll according to an alternative of the method according to the invention.

According to the preferred exemplary embodiment of the method according to the invention as illustrated in FIG. 4, the intermediate roll 50 is cut in the axial direction at one or more points to produce a plurality of sealing tape rolls 1, which are less wide than the intermediate roll 50. The cutting of the intermediate roll 50 is preferably carried out by means of one or more parallel saws 60. Only one saw 60 is shown in FIG. 4, and an additional parallel cut for cutting the intermediate roll 50 is indicated in broken line. Here, too, other suitable methods for cutting the roll can be used (e.g., knives, heated wires, laser cutting devices, water-jet cutting devices).

Intermediate roll 50 is cut into sealing tape rolls 1 in such a way that foam strips 12 and at least one barrier layer 3 alternate in the axial direction of the sealing tape roll 1. In a sealing tape roll 1, each radially-extending barrier layer 3 is accommodated between two foam strips 12, as a result of which the sealing tape 2 provides a more effective seal against drafts and/or the diffusion of water vapor, and each barrier layer 3 is simultaneously protected from external damage. For reasons of clarity, the preferably provided double-sided adhesive layer 54 lined with peel-off film is not shown in FIG. 3.

In the exemplary embodiment of FIG. 4, sealing tape rolls 1 with exactly one barrier layer 3 are produced. Sealing tape rolls 1 with multiple inner barrier layers 3 can also be produced. In this case, the barrier layers 3 of a sealing tape 2 can comprise different resistances to the diffusion of water vapor. For the formation of the barrier layers 3, furthermore, film strips 20 (or adhesive materials) can be used in which the vapor diffusion resistance is adapted to vary with the environmental conditions. The step of cutting the intermediate roll 50 into individual sealing tape rolls 1 can also be omitted if the entire intermediate roll 50 is already intended to be used as a sealing tape roll 1. In this case, it can nevertheless also be effective, for the sake of a smoother outer surface of the sealing tape roll 1, to cut off the edge areas of the intermediate roll 50.

Figure 5:
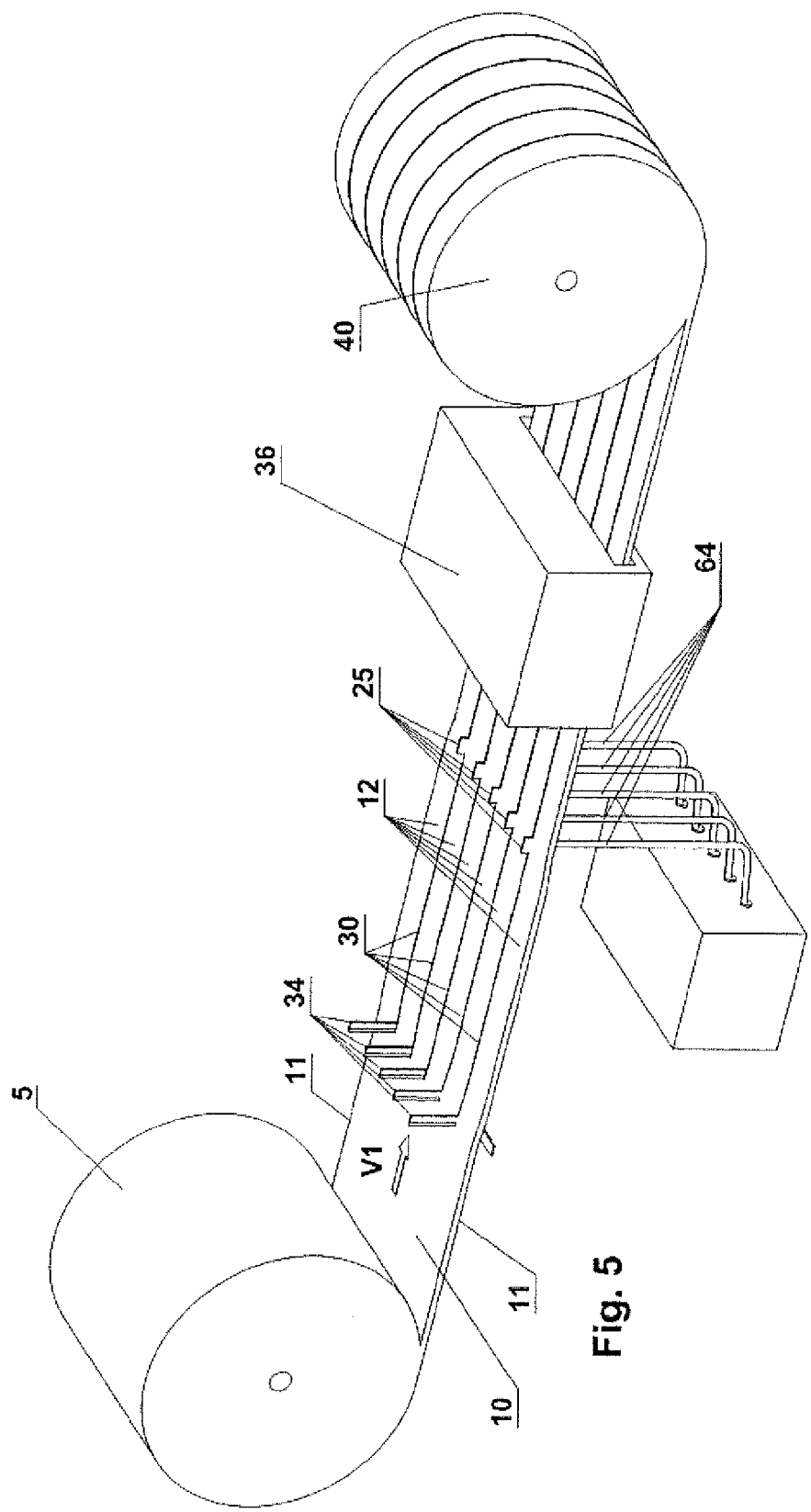
FIG. 5 shows a schematic perspective diagram of the sequence of steps according to another exemplary embodiment of the method according to the invention in a first section of a device adapted to the method.

FIG. 5 shows an alternative possibility for the introduction of the barrier layer 3. The method differs from the method of FIG. 1 only in that, instead of the film strips 20 or the adhesive tape strips, an adhesive liquid medium is introduced into the preferably spread-open intermediate spaces between the foam strips 12 by means of nozzles 64 (e.g., hot-melt nozzles, flat nozzles, mixing nozzles) or by roller application (transfer roller). Depending on the adhesive, the foam strips 12 can then be bonded together, preferably in the bonding unit 36, wherein the adhesive is usually cured. In principle, any type of chemical or physical curing can be considered. Here, too, the bonding of the foam strips 12 usually comprises again a step of applying heat and/or a step of pressing the foam strips 12 against each other. It is also possible to apply a spray adhesive to a film strip 20 according to FIG. 1.

Finally, it is also possible to partially melt the side edges of the foam strips 12 in the intermediate spaces and then to let them harden again, so that the bond between the foam strips 12 is produced by the foam material itself, and a skin of foam material itself acts as the barrier layer 3.

Figure 6:
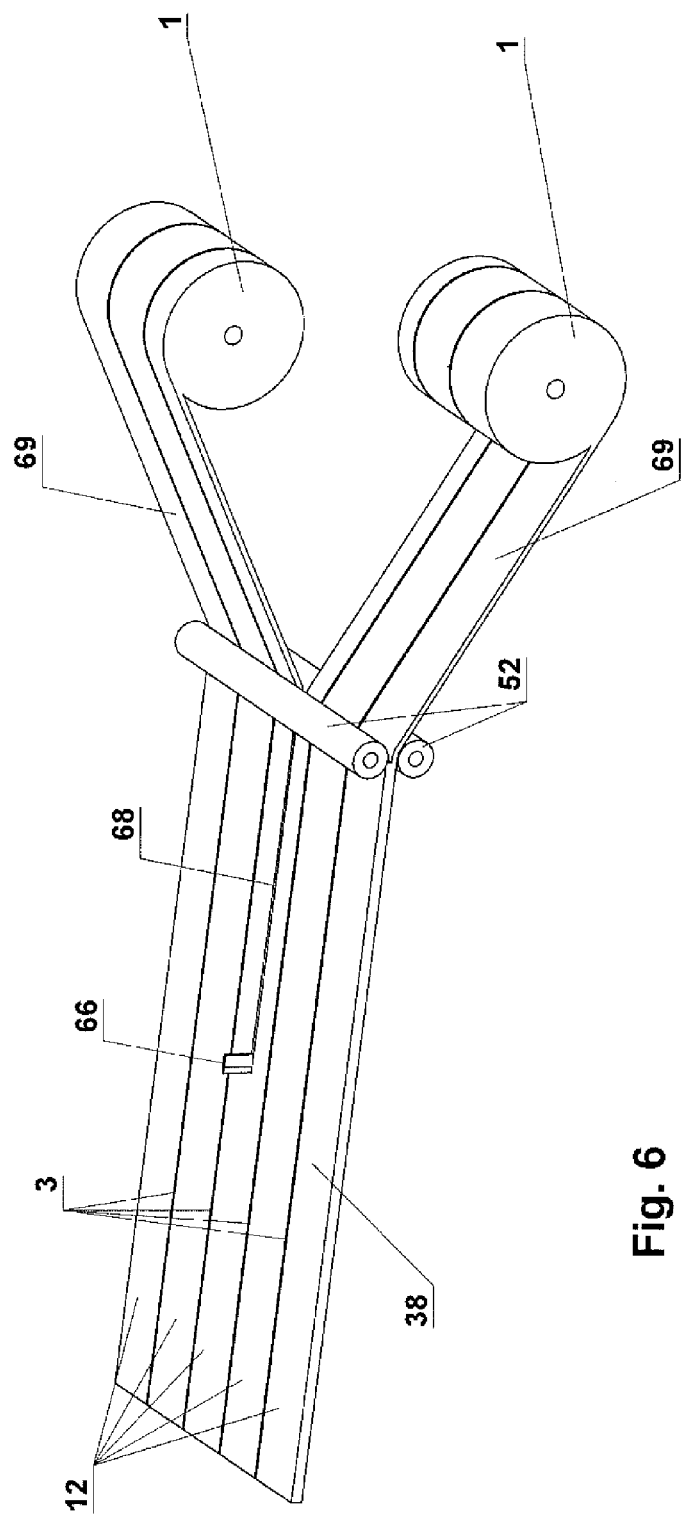
FIG. 6 shows a schematic perspective diagram of the final steps of an alternative exemplary embodiment of the method according to the invention.

FIG. 6 shows another possibility for the final processing of the foam-barrier layer web 38 for the production of sealing tape rolls 1. In addition to the variant shown on the right in FIG. 3 and in FIG. 4, the foam-barrier layer web 38 can also be cut in the longitudinal direction by means of one or more knives 66 or saws in the area of at least one foam strip 12. As a result, at least one cut 68 into the foam-barrier layer web 38 is inserted, as a result of which at least two foam-barrier layer strips 69 are obtained. Each foam-barrier layer strip 69 can then be wound up into a finished sealing tape roll 1. In addition, a double-sided adhesive tape strip 54 lined with a peel-off film as shown in FIG. 3 (not shown in FIG. 6) is also applied. In this way, the step of cutting up an intermediate roll 50 into pieces as shown in FIG. 4 can be omitted. Here, too, compression rollers 52 can preferably be used to precompress the individual foam-barrier layer strips 69.

In addition to the pulling forces caused by the downstream winding-up process, all of the foam webs, foam-barrier layer webs, or foam-barrier layer strips are preferably carried forward by the action of rollers, especially preferably by pairs of counterrotating rollers. Traveling belts can also be used. Such forward transport means can also be used for the film strips or adhesive tape strips.

The heating devices mentioned in the exemplary embodiments are usually configured as hot-air blowers. Radiant heat can also be considered, however, such as that produced by infrared heaters or microwave heaters.

FIG. 7 shows an installation situation of the sealing tape 2 produced by the method according to the invention. For installation, the sealing tape 2 must first be unwound from the sealing tape roll 1 and cut into strips of the desired length. The thickness and length of the sealing tape 2 on the sealing tape roll are the same as the thickness and length of the original foam web 10. The width of the sealing tape 2 is usually in the range between 10 mm and 20 cm, and preferably from 2-12 cm.

The length of the cut-off pieces of sealing tape is usually adapted to the external contours of the window frame or door frame to be sealed. The sealing tape 2 is then attached to the window frame 70 or door frame, preferably by means of the double-sided adhesive tape strip 54 or other adhesive layers, adhesive tape strips, or other suitable means.

In the installation situation shown in FIG. 7, the sealing tape 2 is accommodated between a window frame 70 and a masonry wall 72 in order to seal off the joint between them. The illustrated sealing tape 1 comprises, in this case, three barrier layers 3 between four foam layers 62, wherein the two outer foam layers 62 are only half as wide as the two inner foam layers 62. The inner foam layers 62 correspond to the foam strips 12 after the step of introducing the at least one cut 30 in FIG. 1.

As described above, any desired number of barrier layers 3 can be present in the sealing tape 2, and the individual foam layers 62 can vary in width; it is even conceivable that the foam layers 62 inside the same sealing tape 2 could have different widths.

The sealing tape 2 is to be installed in such a way that each barrier layer 3 extends from the window frame 70 to the masonry wall 72 and thus essentially at a right angle to a functional direction F of the sealing tape 2. The functional direction F extends here parallel to the surfaces of the window frame 70 and of the masonry wall 72 forming the joint to be sealed and proceeds from the outside of the room (on the left in FIG. 7) to the inside of the room (on the right in FIG. 7). In this way, a reliable seal against drafts and/or vapor diffusion can be guaranteed.

Within the scope of this application, a "barrier layer" 3 designates a layer which is adapted to reducing the passage of air or the diffusion of vapor through the sealing tape 2. A complete blockage of the passage of air or the diffusion of vapor is possible but not absolutely necessary. It can be advisable for at least one barrier layer 3 to be "moisture-variable", in such a way that it is more resistant to diffusion at high humidities than at low humidities or vice versa.

With respect to the materials usable for the barrier layer, reference can be made to US 2013/0154201 A1 or to EP 2733271 A1, for example, the content of which is fully incorporated by reference in this application and is to be considered part of this application.

In addition to the properties of reducing or preventing vapor diffusion, it is especially important that each barrier layer 3 be permanently elastic, so that, even after storage of the sealing tape roll 1 in the compressed state, it continues to behave elastically during the recovery of the sealing tape 2 and at all times rests tightly against the sides of the joint after the sealing tape 2 has been installed in a joint.

The invention claimed is:

1. A method for producing sealing tape rolls of flexible compressed foam with at least one barrier layer extending in a radial direction, the at least one barrier layer arranged axially between two layers of the foam, the method comprising:
    providing a foam web of flexible foam;
    introducing at least two cuts into the foam web in a longitudinal direction thereof to form parallel foam strips;
    introducing a film strip, an adhesive tape strip or an adhesive liquid medium into each intermediate space between two adjacent foam strips produced by the at least two cuts;
    bonding all of the foam strips together to produce a foam-barrier layer web, in which foam strips and at least two barrier layers alternate, the barrier layers originating from the film strip, the adhesive tape strip, or the adhesive liquid medium; and
    winding up the foam-barrier layer web into an intermediate roll and cutting the intermediate roll at one or more points in an axial direction thereof to produce a plurality of sealing tape rolls, which are less wide than the intermediate roll, wherein each of the plurality of sealing tape rolls is of flexible, compressed foam with at least one of the barrier layers extending in the radial direction thereof, the at least one of the barrier layers arranged axially between two layers of the foam.

2. The method of claim 1 wherein providing the foam web comprises the steps of providing a starting roll consisting of a wound-up foam web and unwinding the foam web from the starting roll.

3. The method of claim 1 wherein the foam web is not impregnated and the method comprises the following additional steps:
    saturating the foam-barrier layer web with an impregnation agent; and
    drying the impregnated foam-barrier layer web.

4. The method of claim 3 wherein before the step of saturating the foam-barrier layer web the following steps are carried out:
    winding up the foam-barrier layer web into a supply roll; and
    unwinding the foam-barrier layer web from the supply roll.

5. The method of claim 1 wherein cutting of the intermediate roll is carried out by saws.

6. The method of claim 1 wherein introducing each film strip into each intermediate space between two adjacent foam strips is carried out by unwinding the film strip from a coil or roll and deflecting the film strip with a deflecting element.

7. The method of claim 1 wherein introducing the adhesive liquid medium into each intermediate space is carried out by means of a nozzle.

8. The method of claim 1 wherein bonding of the foam strips together comprises the step of bonding each film strip to the two foam strips adjacent to the film strip by lamination.

9. The method of claim 1 wherein bonding of all the foam strips together comprises the step of curing the adhesive liquid medium in each intermediate space.

10. The method of claim 9 wherein curing the adhesive liquid medium is achieved by chemical or physical processes.

11. The method of claim 1 wherein bonding of all the foam strips together comprises the step of applying heat.

12. The method of claim 1 wherein bonding of all the foam strips together comprises the step of pressing the foam strips against each other.

13. The method of claim 1 wherein introducing each cut into the foam web is carried out by a knife or a saw.

14. The method of claim 1 wherein each cut passes completely through the foam web from top to bottom.

* * * * *